UNITED STATES PATENT OFFICE.

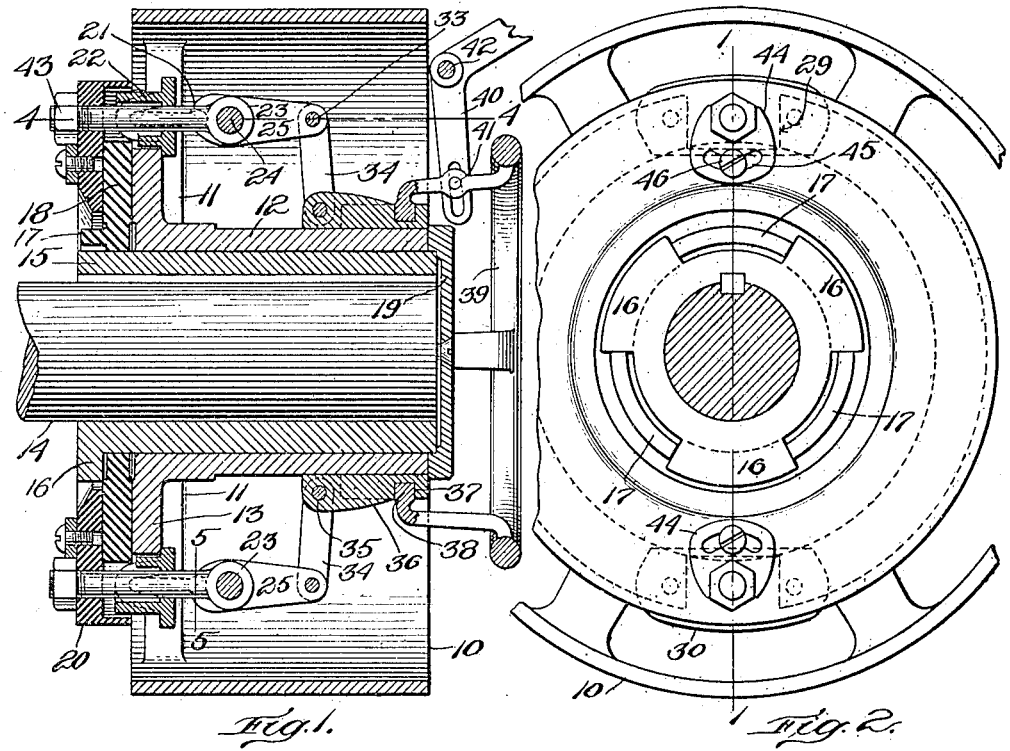

ALFRED B. NUTTING AND HARVEY R. NUTTING, OF AMESBURY, MASSACHUSETTS.

CLUTCH.

1,292,859. Specification of Letters Patent. Patented Jan. 28, 1919.

Application filed December 29, 1915. Serial No. 69,279.

*To all whom it may concern:*

Be it known that we, ALFRED B. NUTTING and HARVEY R. NUTTING, citizens of the United States, and both residents of Amesbury, in the county of Essex and Commonwealth of Massachusetts, have invented an Improvement in Clutches, of which the following description, in connection with the accompanying drawings, is a specification, like characters on the drawings representing like parts in each of the several views.

This invention relates to clutches of a friction type well adapted for use as pulley clutches. One prime object of the invention is to provide a friction clutch for pulleys and other uses, with improved operating connections whereby the clutch is adapted to be engaged and disengaged with a small exertion of force, thus making the same more convenient for hand operation. A further object is to provide an improved and simplified construction and aggroupment of parts whereby a strong, serviceable, and efficient clutch mechanism may be produced cheaply and readily from cast iron or other cast metal. To this end in the preferred embodiment shown we provide a pocket member formed as a one piece casting adapted to be set into the pulley flange with strut members working in said pocket and constituting part of a toggle or knuckle operating mechanism for effecting a powerful clamping action between the clutch members, that is at the same time easily broken and released with a small exertion of force. In accordance with our invention the connection from this strut and toggle device to the manually engageable member is preferably through a link having substantially right angle relation with its coöperative members when the parts are in clutching position. A still further object has to do with improved means whereby the friction pulley including our improved clutch device may be readily applied to shafts of varying sizes. The foregoing and other objects and features of the invention will be better understood from the following detailed description taken in connection with the accompanying drawings and will be thereafter pointed out in the appended claims.

Referring to the drawings:

Figure 1 shows in central lengthwise section on line 1—1 of Fig. 2 a friction pulley equipped with our improved clutch mechanism;

Fig. 2 is an end view thereof with the shaft in section looking from the left in Fig. 1 with a part broken away;

Fig. 3 is a fragmentary section on line 3—3 of Fig. 4;

Fig. 4 is a fragmentary section on line 4—4 of Fig. 1; and

Fig. 5 is a fragmentary view partly in elevation and partly in section on line 5—5 of Fig. 1.

The pulley to which the clutch of the present invention is shown applied, is indicated at 10, with spokes 11 joining its hub 12, there being a radial flange plate 13 preferably integral with said hub at one end of the pulley to constitute the clutch face of the pulley. A shaft to which the pulley is fitted is indicated at 14. A sleeve 15 keyed or otherwise secured to this shaft, has at its inner end spaced apart projections 16 constituting shoulders engageable with flange projections 17 on a clutch plate 18. It will be noted that in assembling the parts the clutch plate 18 may be slipped over the sleeve 15 from the outer end and the flange projections 17 slipped to place between the projections 16 of the sleeve and the pulley then also slipped over the sleeve from the outer end. The parts so assembled are held in place by a cap 19 which is fitted over the end of the shaft and secured to sleeve 15. In this way it will be noted, when the pulley with the clutch mechanism is to be applied to shafts of different sizes, this can readily be done, merely by selecting a sleeve 15 of the proper internal diameter to fit the shaft, a stock of these sleeves of the same external diameter but varying internal diameters for different sizes of shafts being preferably kept on hand. To obtain the friction clutching pressure, the clutch member 18 is clamped between the flange plate 13 and an outer plate 20 by means of a plurality, shown as two, of clamping devices connected to be actuated by a single operating means. As shown at each side of the pulley an eye bolt 21 is passed through the outer plate 20 and through a pocket 22 with its eye 23 extending some little within the pulley and affording a bearing for an axis bolt 24 constituting a fulcrum for levers 25 mounted at each side of said bolt, the inner ends of said levers constituting one part of a toggle device and for this purpose having concave seats as seen at 26 to receive each a strut 27, the other end of which fits into a seat in the pocket 22 as seen at 28. The pockets 22 are each fitted into diametrically opposite recesses 29 therefor in the plate 13 being equipped with flanges 30 to engage the plate at each side of the recess and being secured thereto by suitable means shown as screw bolts 31. The outer ends of the levers 25 which are of some little length are preferably bent in so as to come together as seen at 32 and their extremities are pivotally connected at 33 with a link 34, the other end of which is pivotally engaged as seen at 35 with a collar 36 slidably fitted on the hub 12. This collar as shown has an annular recess 37 to receive a ring 38 inturned from an operating handle 39. This handle 39 may, for all ordinary sizes of wheels, be directly operated by the hand, since as will be apparent, relatively little power is required to operate the clutch. A lever connection 40 may, if desired, be provided, having a pin and slot engagement 41 with the handle, this lever being fulcrumed at 42. It will be noted that with our improved construction, the link members 34 may be so formed and disposed with relation to the levers 25 and the collar 36 that they are substantially at right angles to said levers and also to the direction of collar movement as the parts approach and reach clutching position, i. e., as the toggle formed by the struts 27 is straightened as shown. Thus great clutching power is attained and it is at the same time possible to release the clutch with comparatively little exertion since both the toggle members and the links 34 are in the most favorable position for actuation, i. e., they are in that position where an impulse on the actuating handle exerts the greatest possible leverage. It will be understood that in order to obtain this easy actuation of the parts within the essential small limits, i. e., just at the clutching position, they must be nicely adjusted, since only a small variation in the position of the fulcrum points, e. g., of the fulcrum pins 24 would seriously interfere with the desired object. To obtain this correct adjustment the bolts 21 have their projecting ends threaded to receive nuts 43. These nuts may be turned to bring the fulcrum pins 24 to approximately correct adjustment, and to obtain a more precise adjustment, spanner plates 44 are fitted to said nuts, these plates having arcuate slots 45 to some little length through which are passed clamp screws 46. Thus by turning these spanner plates one way or the other as found necessary by trial, the fulcrum pins 24 may be set in exactly correct position as found to produce best results.

It is to be noted that the formation of the pockets 22 as separate members inserted and held in place in recesses therefor in the wheel flange, permits these parts to be readily produced of iron castings which would otherwise be impracticable, and the construction strut members 27 formed to fit into these pockets and with their ends forming a knuckle or ball and socket joint with the levers 25, makes it possible to produce these parts also of simple inexpensive castings. The mounting of the operating elements consisting in the clamp bolts 21 with the strut holding pockets and coöperating levers as shown, results in the clutch clamping pull being produced at the periphery of the clutch plates, at equi-distant points about the circumference thereof, thus obtaining a most effective clutching engagement. We are aware that the invention may be embodied in other specific forms as to its several features and we therefore desire the present embodiment to be considered as illustrative and not restrictive, reference being had to the appended claims rather than to the foregoing description to indicate the scope thereof.

Having described our invention, what we claim as new and desire to secure by Letters Patent is:

1. Clutch mechanism, comprising driving and driven members having each a radially extending clutch plate, and means for drawing said plates into clutching engagement consisting in a pocket removably fitted to one of said plates adjacent the periphery thereof, a strut fitted to operate in said pocket, and means engageable with the other clutch plate formed to coöperate with said strut to form a toggle adapted when straightened to force said plates into clutching engagement.

2. Clutch mechanism, comprising driving and driven members, each having a radially extending friction clutch plate, and means for drawing said plates together, said means consisting in a bolt having means for engaging one of the plates, a pocket removably set into the other plate, a strut operable in said pocket, a lever having a fulcrum mounting on said bolt and coöperative with said strut to form a toggle joint, and means for operating said lever.

3. Clutch mechanism, comprising driving and driven members having each a radially extending friction clutch plate, and means for drawing said plates into clutching engagement, said means consisting in a pocket separably fitted in one of said plates adjacent the periphery thereof, an eye bolt passing through said pocket and engaged with the other clutch plate, a pair of struts fitted to move in said pocket at each side of said eye bolt, lever members fulcrumed to the eye of said eye bolt, and forming with said struts complementary members of a toggle, and manually operable means for operating said lever members.

4. Clutch mechanism, comprising a pulley having a radially extending clutch flange, cast iron pockets set into said flange adjacent the periphery thereof at equi-distant points around its periphery, strut members operative in said pockets, a flange plate adapted to be drawn into clutching engagement with said clutch flange, and means for effecting such clutching engagement consisting in bolts having an outer plate operatively associated therewith and engageable with said flange plate and said bolts having fulcrumed thereon lever members coöperative with said struts to form toggles at each of said pockets.

5. Clutch mechanism, comprising driving and driven members, one thereof being a wheel with an elongated sleeve hub and a radial clutch flange extending therefrom at one end thereof, and the other member being a sleeve adapted to fit within said hub and selective as to internal diameter for fitting different sized shafts, said sleeve having detachably fixed thereto a clutch plate coöperative with the clutch flange of said wheel, and means housed within said wheel for drawing said plate and flange into clutching engagement.

6. Clutch mechanism, comprising driving and driven members, one thereof being a wheel with an elongated hub and a clutch flange extending radially therefrom, and the other member being a sleeve loosely fitted within said hub and adapted to be detachably secured to a shaft, having a clutch plate detachably fitted thereto adapted to coöperate with said clutch flange of the wheel whereby such sleeve with a bore as required for a particular shaft may be selected, and toggle operated means for drawing said clutch plate and clutch flange of the wheel into clutching engagement, said means having an operating collar slidable on said wheel hub.

7. Clutch mechanism, comprising clutch plates adapted to be drawn together in clutching engagement, and means for drawing said plates together consisting in a bolt having pivoted thereto at one end a toggle mechanism engageable with one of said plates, a slidably mounted operating member having a link connected to said toggle, said toggle and link being formed so that the link is approximately at right angles to the direction of movement of said operating member when said toggle is straightened, and means for effecting a minutely accurate adjustable engagement of said bolt with the other clutch plate, said means consisting in a nut fitted to the bolt and having a spanner member engaged therewith with provision for clamping in variable definite positions.

In testimony whereof, we have signed our names to this specification, in the presence of two subscribing witnesses.

ALFRED B. NUTTING.
HARVEY R. NUTTING.

Witnesses:
H. M. GIFFIN,
V. M. DAVENPORT.

Copies of this patent may be obtained for five cents each, by addressing the "Commissioner of Patents, Washington, D. C."